US010664535B1

(12) United States Patent
Hahn

(10) Patent No.: US 10,664,535 B1
(45) Date of Patent: May 26, 2020

(54) RETRIEVING LOG DATA FROM METRIC DATA

(71) Applicant: Amazon Technologies, Inc., Seattle, WA (US)

(72) Inventor: Henry David Hahn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 568 days.

(21) Appl. No.: 14/611,787

(22) Filed: Feb. 2, 2015

(51) Int. Cl.
*G06F 16/248* (2019.01)
*G06F 16/9535* (2019.01)

(52) U.S. Cl.
CPC .............................. *G06F 16/9535* (2019.01)

(58) Field of Classification Search
CPC .... G06F 16/22; G06F 16/248; G06F 16/2225; G06F 16/2228; G06F 16/2462; G06F 16/2477
USPC .......................................................... 707/722
See application file for complete search history.

(56) References Cited

U.S. PATENT DOCUMENTS

| 8,478,800 | B1 | 7/2013 | Johnson et al. | |
|---|---|---|---|---|
| 8,554,699 | B2 * | 10/2013 | Ruhl | G06Q 10/06 706/12 |
| 8,625,757 | B1 * | 1/2014 | Karpov | H04M 15/00 379/112.03 |
| 8,661,068 | B1 | 2/2014 | Seibel et al. | |
| 8,682,816 | B2 * | 3/2014 | Ruhl | G06Q 10/06 706/12 |
| 8,732,300 | B2 | 5/2014 | Barsness et al. | |
| 8,769,701 | B2 | 7/2014 | Hinton et al. | |
| 8,806,005 | B2 | 8/2014 | Miri et al. | |
| 9,122,841 | B2 * | 9/2015 | Pavlov | G06F 21/00 |
| 9,384,112 | B2 * | 7/2016 | Petersen | G06F 11/0709 |
| 9,626,240 | B2 * | 4/2017 | Rajkovic | G06F 11/0781 |
| 2003/0079043 | A1 | 4/2003 | Chang et al. | |
| 2003/0093572 | A1 | 5/2003 | Laux et al. | |

(Continued)

FOREIGN PATENT DOCUMENTS

WO   WO2013/165369   11/2013

OTHER PUBLICATIONS

Preliminary Report on Patentability for PCT/US2015/015808, dated Jun. 10, 2015, 8 pages.

(Continued)

*Primary Examiner* — Jean M Corrielus
(74) *Attorney, Agent, or Firm* — Klarquist Sparkman, LLP

(57) ABSTRACT

A log data service is described for a multi-tenant environment that allows customers to access system, application and custom log files associated with virtual machine instances that are executing. In some embodiments, log data can be received that includes events or messages from virtual machines in the multi-tenant environment. The log data can be transformed into metric data, which can be used to generate statistics, graphs, and generally monitor the customer's virtual machine instances. Once a customer has started monitoring log files, the customer can be notified that an actionable condition can exist, such as an alarm condition wherein metrics exceeded acceptable limits. A customer can interactively select a timeframe of a metric and request that the log data that generated the metric be presented on the display. An automated system retrieves the source-level log data in real-time upon receiving a request from a user.

18 Claims, 12 Drawing Sheets

(56) References Cited

U.S. PATENT DOCUMENTS

| | | |
|---|---|---|
| 2005/0198238 A1 | 9/2005 | Sim et al. |
| 2008/0250265 A1 | 10/2008 | Chang et al. |
| 2009/0089128 A1 | 4/2009 | Tkatch et al. |
| 2009/0292954 A1 | 11/2009 | Jiang et al. |
| 2010/0161574 A1 | 6/2010 | Davidson et al. |
| 2010/0174939 A1 | 7/2010 | Vexler |
| 2011/0119100 A1* | 5/2011 | Ruhl ............... G06Q 10/06 705/7.11 |
| 2011/0119374 A1* | 5/2011 | Ruhl ............... G06Q 10/06 709/224 |
| 2011/0282908 A1 | 11/2011 | Fly et al. |
| 2011/0314148 A1* | 12/2011 | Petersen ........... G06F 11/3476 709/224 |
| 2012/0089726 A1 | 4/2012 | Doddavula |
| 2012/0124294 A1 | 5/2012 | Atkisson et al. |
| 2012/0311475 A1 | 12/2012 | Wong |
| 2013/0007183 A1 | 1/2013 | Sorenson et al. |
| 2013/0007265 A1 | 1/2013 | Benedetti et al. |
| 2013/0014107 A1 | 1/2013 | Kirchhofer |
| 2013/0066869 A1 | 3/2013 | Kusaka et al. |
| 2013/0080642 A1 | 3/2013 | Adam et al. |
| 2013/0173536 A1 | 7/2013 | Gokhale |
| 2013/0238572 A1 | 9/2013 | Prahlad et al. |
| 2013/0263209 A1 | 10/2013 | Panuganty |
| 2014/0012901 A1* | 1/2014 | Ruhl ............... G06Q 10/06 709/203 |
| 2014/0164700 A1 | 6/2014 | Liang |
| 2014/0196013 A1 | 7/2014 | Orr et al. |
| 2014/0201737 A1 | 7/2014 | Mitkar et al. |
| 2014/0208001 A1 | 7/2014 | Liu et al. |
| 2014/0215574 A1 | 7/2014 | Erb et al. |
| 2014/0281131 A1 | 9/2014 | Joshi et al. |
| 2014/0324862 A1* | 10/2014 | Bingham ........... G06F 9/45533 707/737 |
| 2014/0344622 A1 | 11/2014 | Huang et al. |
| 2015/0039712 A1 | 2/2015 | Frank et al. |
| 2015/0081880 A1* | 3/2015 | Eaton .............. H04L 47/785 709/224 |
| 2015/0081883 A1* | 3/2015 | Katz .............. H04L 47/785 709/224 |
| 2015/0081885 A1 | 3/2015 | Thomas et al. |
| 2015/0082432 A1* | 3/2015 | Eaton .............. H04L 47/785 726/23 |
| 2015/0095289 A1 | 4/2015 | Prabhu et al. |
| 2015/0227598 A1 | 8/2015 | Hahn et al. |
| 2015/0229546 A1 | 8/2015 | Somaiya et al. |
| 2015/0295766 A1 | 10/2015 | Dickey |
| 2016/0147622 A1* | 5/2016 | Nichols ............. G06F 16/178 714/57 |
| 2017/0085447 A1* | 3/2017 | Chen .............. G06F 16/248 |
| 2019/0163678 A1* | 5/2019 | Bath ............... G06F 3/0481 |

OTHER PUBLICATIONS

International Search Report and Written Opinion for PCT/US2015/015808, dated Jun. 10, 2015, 8 pages.

"FactFinder Enterprise," BlueStripe Software, http://bluestripe.com/products/factfinder/, retrieved Jan. 28, 2015, 3 pages.

logstash—Introduction, Jun. 25, 2014, 9 pages, downloaded from http://web.archive.org/web/20140625164919/http://logstash.net/docs/1.4.2/tutorials/getting . . . .

logstash—open source log management, Jul. 21, 2014, 3 pages, downloaded from http://web.archive.org/web/20140721075828/http://logstash.net/docs/1.4.2.

logstash—Pull metrics from logs, Jul. 2, 2014, 3 pages, downloaded from http://web.archive.org/web/20140702215035/http://logstash.net/docs/1 .4.2/tutorials/metric . . . .

logstash—ship logs from any source, parse them, get the right timestamp, index them, and search them, Dec. 8, 2014, 2 pages, downloaded from http://web.archive.org/web/20141208211709/http://logstash.net/.

logstash, What is, Jul. 15, 2014, 1 page, downloaded from http://web.archive.org/web/20140715101926/http://logstash.net/docs/1.4.2/learn.

* cited by examiner

RETRIEVING LOG DATA FROM METRIC DATA

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Some cloud environments provide monitoring services that monitor the computing resources and applications being run by customers. The customer can also supply custom metrics to such monitoring services, the custom metrics being generated by the customer's own applications. The monitoring services can use the received custom metric data to allow a customer to gain system-wide visibility into resource utilization, application performance and operational health.

Once the metric data is received, no functionality is provided to find out from where the metric data was obtained. Thus, customers need to review source log data manually to further analyze the metric data.

DETAILED DESCRIPTION

A log data service is described for a multi-tenant environment that allows customers to access system, application and custom log files associated with virtual machine instances that are executing. In some embodiments, log data can be received that includes events or messages from virtual machines in the multi-tenant environment. The log data can be transformed into metric data, which can be used to generate statistics, graphs, and generally monitor the customer's virtual machine instances. The log data can also be stored as a service so that the customer has a central repository for which to access the log data. Once a customer has started monitoring log files using the service in the multi-tenant environment, the customer can be notified that an actionable condition can exist, such as an alarm condition wherein metrics may have exceeded acceptable limits. In one embodiment, a customer can interactively select a timeframe of a metric and request that the log data that generated the metric be presented on the display. Such a portion of the log data is called the source-level log data. Previously, the customer would need to manually go through the log files to determine which events were used to generate the metrics. Instead, an automated system can be used to retrieve the source-level log data in real-time upon receiving a request from a user. For example, an Application Programming Interface (API) request can be generated in response to a user request to view the source-level log data. The API request can include a metric filter that was used to generate the metric data in the first place. Using the metric filter, the service can search through the log data and dynamically determine which events caused the metric data to be generated.

Figure 1:
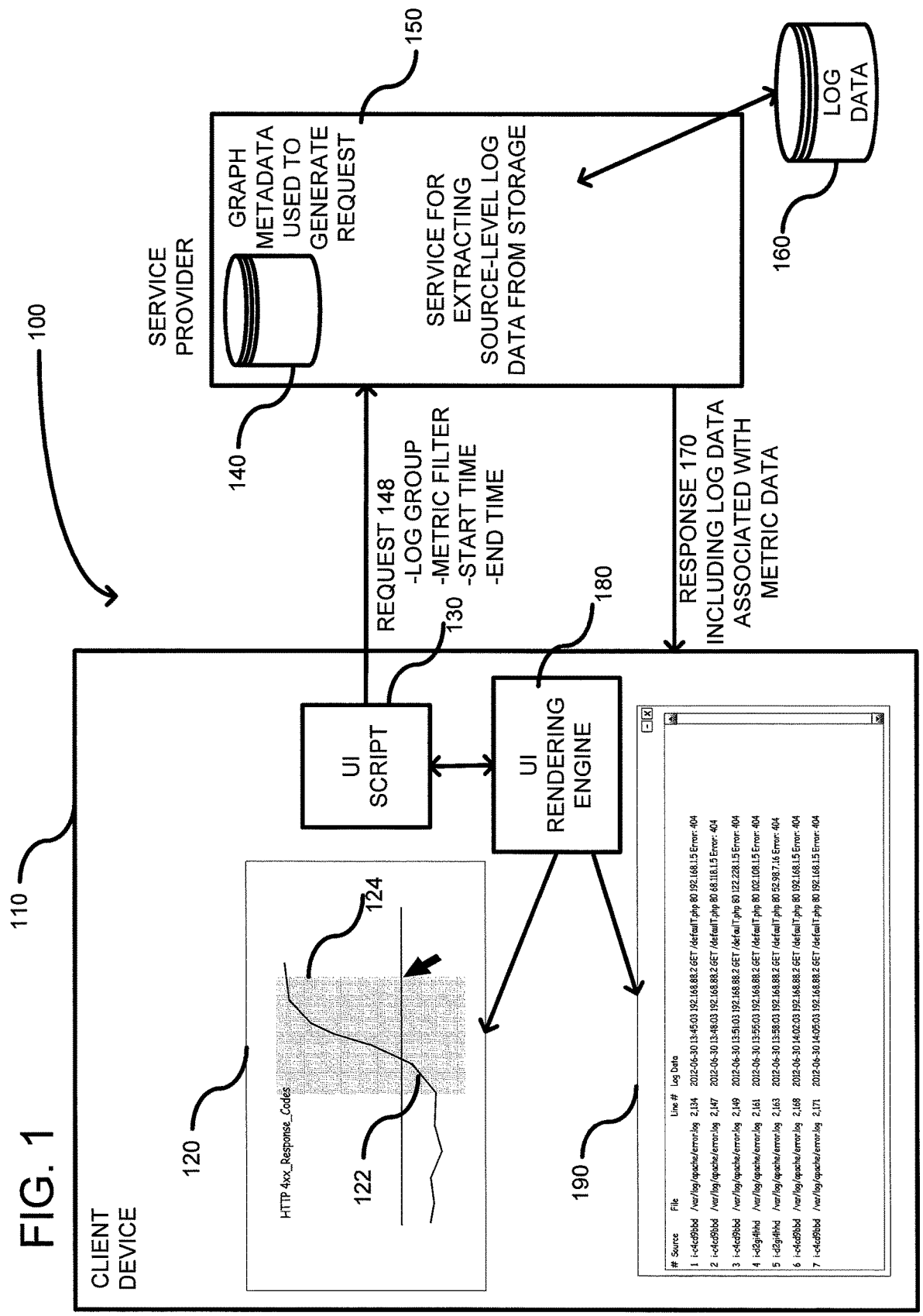
FIG. 1 is an overall system diagram showing a user interface on a client device used for viewing metric data and retrieving source-level log data associated with the metric data upon request.

FIG. 1 illustrates an example system 100 that can be used to retrieve source-level log data. A client device 110 includes a graphical user interface (GUI) 120 that can be used to view metric data. The metric data is shown by a graph 122 using a time-based X-axis and a Y-axis showing a number of occurrences of the particular metric. The user interface 120 is interactive as is shown through a selected area 124. As further described below, the selected area, which is a portion of the entire graph, can be used to establish desired start and end times. Upon receiving a request to view source-level log data (e.g., through selection of a UI button), a UI script 130 can be executed. The script 130 can retrieve stored metadata from storage 140 (e.g., memory, hard drive, etc.) located on a service provider 150 through a request (not shown). The storage 140 can alternatively be located on the client device. The metadata can include information about the graph, such as one or more identifiers of the associated log data and a metric filter that can be used in retrieving the source-level log data. The metric filter can be, for example, a search pattern used to search stored log data. The UI script can automatically generate a request 148, such as an API request, that is transmitted over a network (not shown in FIG. 1) to a service provider, shown generally at 150. The service provider 150 can include one or more server computers for receiving the API request, searching through log data in a storage 160, and generating one or more API responses 170. The storage, as described herein, can be a database, a memory, a server computer, a hard drive, etc. Using information in the request 148, such as a log group identifier, the metric filter, and the start and end times, the service provider 150 can extract the source-level log data from the storage 160. Generally, the storage includes a large number of events, and the source-level log data is only a portion of the overall log data. The metric filter can be virtually any pattern, such as numeric patterns, alpha-numeric patterns, alphabetic patterns, etc. To provide a simple example, the metrics can be related to 404-type errors and the source-level log data is only those events that contain such errors. In this example, the metric filter can include the pattern "Error: 404", which is used by the service provider to search through the log data 160. For each event found, the service provider 150 can begin to generate the API response including the events matching the metric filter. Once the service provider 150 has completed the request, the response 170 is transmitted back to the client device 110. The API response can be received by the script 130 and transmitted to a UI rendering engine 180 within the client device 110. The UI rending engine 180 can then display the source-level log data in the GUI as indicated at 190.

Figure 2:
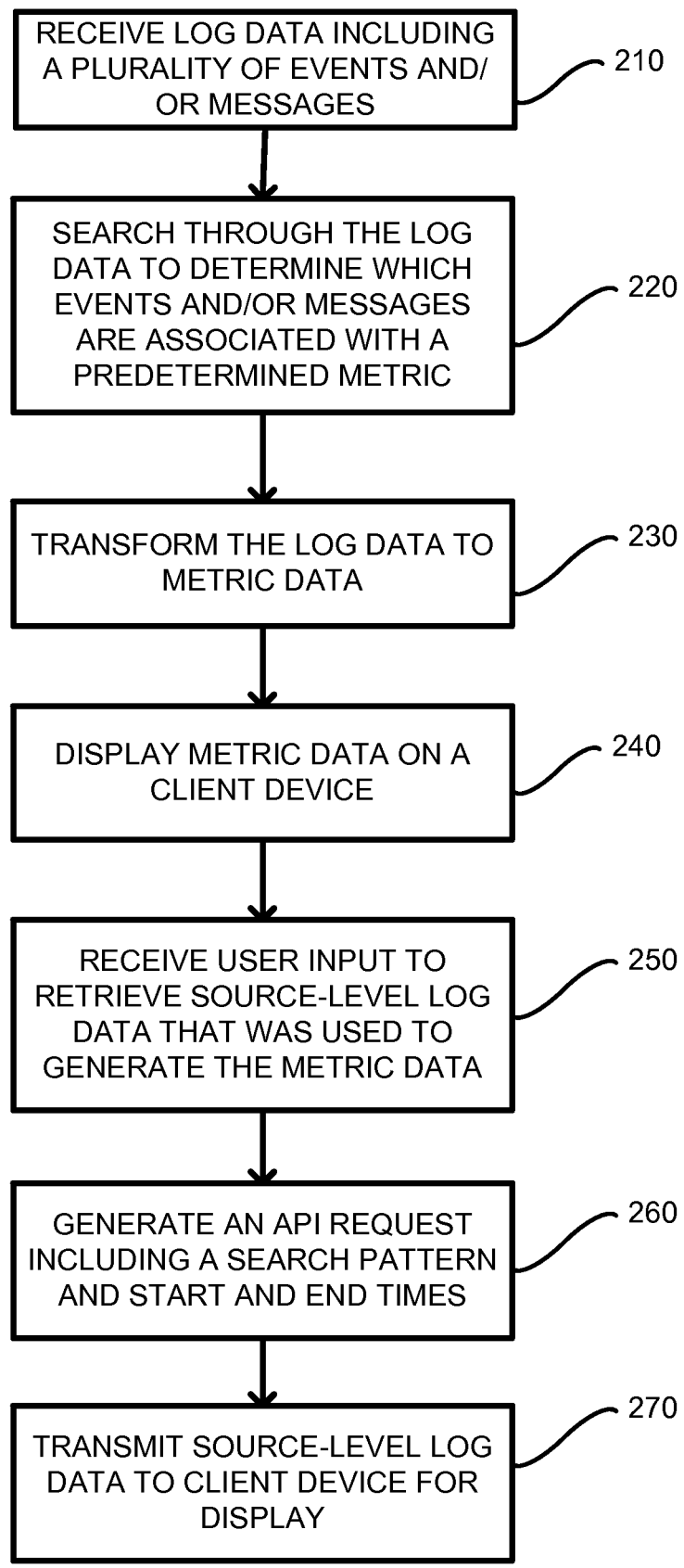
FIG. 2 shows an overall flowchart of a method according to one embodiment for generating metric data and then processing a request to obtain source-level log data associated with the metric data.

FIG. 2 is an overall detailed flowchart of a method according to one embodiment. In process block 210, log data is received including a plurality of events and/or messages. As described further below, the events/messages typically include a timestamp and describe an event or message associated with an application executing on the service provider. As described above, an error message is an example of an event that can occur, but any desired events and/or messages can be inserted into the log data. In process block 220, in generating metric data, a search is performed to determine which events and/or messages are associated with the particular metric being examined. In process block 230, the log data can be transformed to metric data. A simple example is that the desired metric is all log events/messages that include a 4xx level error. Thus, any log events and/or messages having such an error can increase a metric counter. The pattern used to generate the metric data (e.g., Error 4xx) can be stored and associated with the metric data as metadata (e.g., a metric filter). In process block 240, the metric data can be displayed on a client device, such as through a GUI. In process block 250, user input can be received requesting to view the source-level log data that was used to generate the display of the metric data. In response to the user request, in process block 260, an API request can be automatically generated including a search pattern and the start and end times. The start and end times can be user selectable or such times can be automatically generated based on the displayed data. Both the start and end times are typically associated with a range of desired time along the X-axis of a displayed graph, but other mechanisms for selecting start and end times can be used. In any event, the events and/or messages in the log data include time stamps of when they occurred, and the start and end times describe obtaining events and/or messages having time stamps between the start and end times.

Figure 3:
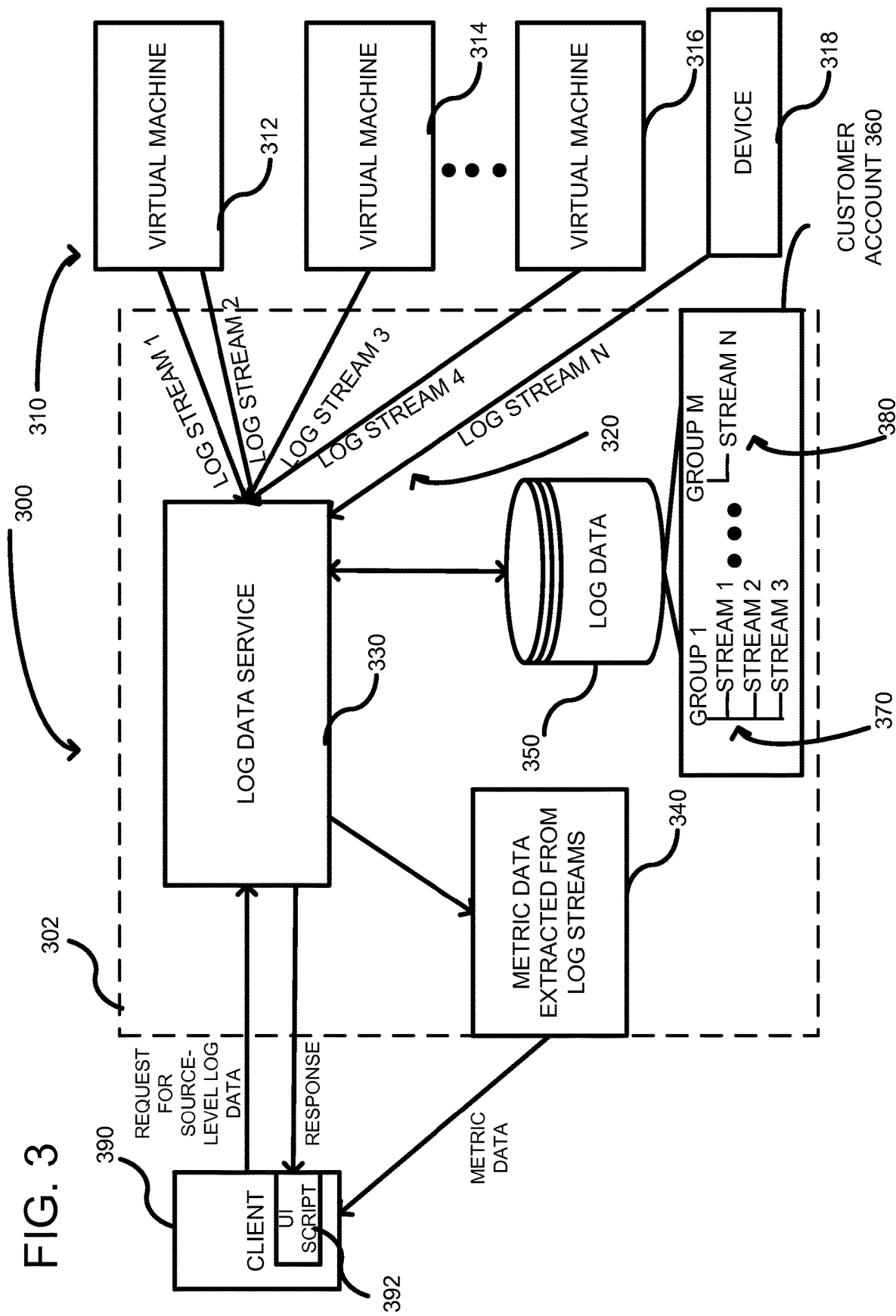
FIG. 3 is an overall system diagram illustrating a log data service that collects a plurality of log streams and generates metric data for viewing by a client device. The log data service further accepts API requests for retrieving source-level log data.

FIG. 3 is an overall diagram illustrating a system 300 including a log data system 302 that collects a plurality of log streams and groups the log streams for access by a customer. The system 300 includes a plurality of virtual machines 310 (any integer number of virtual machines can be used) that can be running in a multi-tenant environment on a plurality of host server computers. The virtual machines are associated with a single customer in this example, but the log data service is typically used by a plurality of customers simultaneously. Generally, the virtual machines include an operating system and one or more applications. Each virtual machine can generate one or more log streams associated with recording events taking place while executing. The log streams can be a continuous stream of data or a log file that is transmitted in predetermined data chunks. The log streams can be useful in order to provide an audit trail used to track the activity of the system and to diagnose problems. Each log stream can be a registered named source of log events associated with a customer and each log stream can be uniquely named. The log streams generally include individual entries that have information about an event or message from an application. The event entry in the log data can include such things as a timestamp, an IP address of a requestor and/or the recipient, a resource being requested, a user agent, etc. The log stream can be used to maintain a logical grouping of log events, while separating it from other streams.

As indicated, a virtual machine 312 includes multiple streams that are being concurrently transmitted. Any number of concurrent streams can be transmitted from a virtual machine and each stream is generally associated with a source (e.g., an instance identifier, a host name, an application name, a file path, etc.) or with a type of data (system event logs, error logs, transaction logs, etc.). Virtual machines 314, 316 are shown transmitting a single stream, but, like virtual machine 312, can be transmitting any number of streams. The streams can be described by the customer with metadata (e.g., tags) to make it easier to access and manage the stream of events. A customer can have many log streams on an individual host server computer and/or many log streams across a plurality of host server computers, which are executing the virtual machines. The log streams can also be generated by other devices, as shown at 318, such as hardware or software devices within a compute service provider or external to the compute service provider.

The streams, shown generally at 320, are received by a log data service 330. As described further below, the log data service can be a service offered by a compute service provider to which customers can subscribe with payment of a fee. As further described below, the log data service 330 can search through the log data received in the log streams 320 and transform the log data into metrics. For example, the log data service can search for the log data using predetermined patterns and for any match of a pattern, a metric can be generated. The predetermined patterns can be retrieved from storage. In a simple example, a pattern can be an "error" message. The log data service 330 can search the log streams for an error message and each time an error message is encountered, an error-message counter can be incremented. In another example, an HTTP 404 error message can be searched on. Such a metric can be monitored and if it exceeds a predetermined threshold, a notification to the customer can be transmitted. As indicated at 340, the log service 330 can transmit the metric data so that it can be used by one or more other services, which perform functions such as allowing a customer to monitor resources, applications, setting alarms, etc. The metric data 340 can include metadata, such as the pattern used to generate the metric data from the log data. The metric data 340 can be transmitted to a client device 390 for consumption. As described further below, the metadata can be stored on the client device 390 for later use.

The log service 330 can also store the log streams 320 in one or more log data storages 350. Generally, the streams are associated with a customer account (which was received or derived from the receipt of the log stream), as indicated at 360. The streams can be associated with a group. A group indicates a type of stream and such groups can be customizable by the customer. For example, multiple streams can be received from different servers all hosting a same website. In such an example, the streams are highly related and linked in that they all relate to website activity, which can be a type. Thus, all of the streams can be associated with a common group. As indicated at 370, Group 1 includes three streams that span two different virtual machines 312 and 314. Group M at 380 only has a single stream from a single virtual machine 316. Thus, each group can be associated with any number of streams sourced from any number of virtual machines, which can span multiple host server computers. Each group or stream can have an identifier associated therewith. The identifiers can also be stored in the metadata associated with the metric data 340.

The client device 390 is shown that is associated with the customer that launched the virtual machines 310. The client can include a UI script 392 that is responsive to user interaction to generate requests, such as API requests. For example, the client 390 can transmit a request, such as an API request, including a group name, a stream name, a time range (e.g., start and end times), a metric filter, etc., in order to obtain the source-level log data stored in the data base 350. Any web service request can be used. Generally speaking, a web service is a software function provided at a network address over the web or the cloud. Clients initiate web service requests to servers and servers process the requests and return appropriate responses. The client web service requests are typically initiated using, for example, an API request. The API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. In this case, the API request from the client 390 is received by the log data service 330, which acts as a centralized repository of log data for virtual machines of the customer. Once the request is received, the log data service 330 can extract source-level log data from the log data storage 350. For example, the API request generally includes a customer account number associated with the customer account 360. This information can be used as a key to access appropriate data in storage 350. Identifiers associated with the group name and/or stream name can further be used to extract the precise data desired, as is well understood in the art. Furthermore, the metric filter can be used to search the identified log data to extract particular events and/or messages within the log data that satisfy the pattern within the metric filter. The parameters used in conjunction with the API request are merely a detailed example and can be modified by adding or eliminating any of the parameters.

Thus, using the log data service, a client 390 can have a central repository in the system 300 for accessing log data generated from multiple virtual machines, and such virtual machines can span multiple server computers. The log data from the multiple streams can be grouped according to type, which is a common feature (e.g., hits on a website, error messages in an application, etc.) associated with the log data, wherein the types can be defined by the customer.

Metric data can then be displayed on the client device. And if a user wants to determine from where the metric data was derived, an API can be generated to the log data service 330 to obtain the source-level log data.

Figure 4:
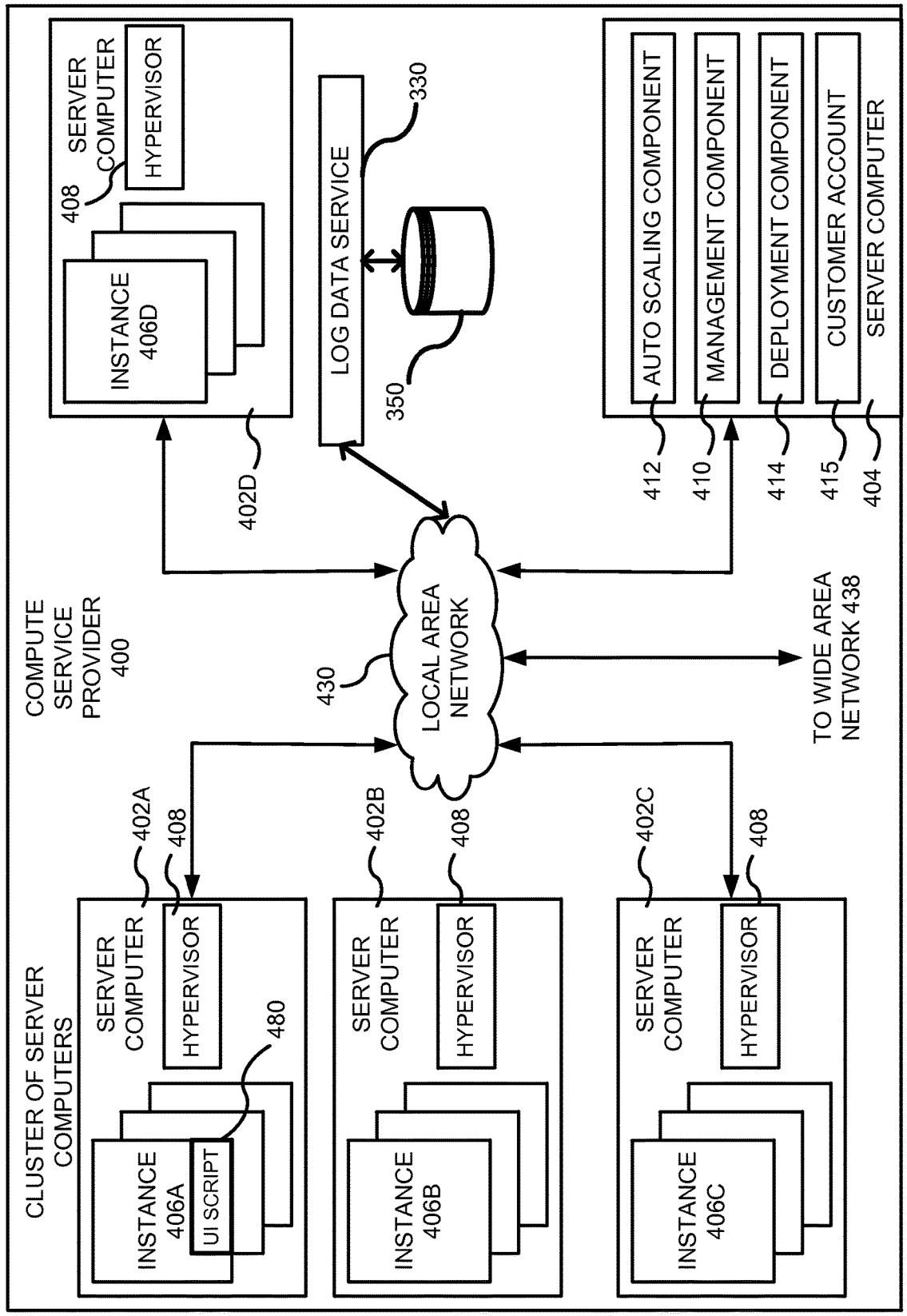
FIG. 4 is an example system diagram showing a plurality of virtual machine instances running in the multi-tenant environment with a log data service in communication with the virtual machine instances.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 438 so that end users can access the compute service provider 400. It should be appreciated that the network topology illustrated in FIG. 4 has been simplified and that many more networks and networking devices can be utilized to interconnect the various computing systems disclosed herein.

The compute service provider 400 can provide one or more services, such as a log data service 330. The log data service 330 can receive log streams from the instances 406 and convert the log streams to metric data. The metric data can then be transmitted to a script, such as a UI script 480 running on one of the instances 406. Alternatively, the UI script can be located on a client device outside of the compute service provider and the UI script can be associated with a browser application executing on the client device. The log data received can be stored by the log data service 330 in a log storage 350. The log storage 350 can store the log data in association with a customer account identifier so that the customer can easily retrieve the original log data. For example, if a customer wants further analysis of a metric, the customer can select one or more GUI elements to execute the script 480, which automatically generates an API to obtain the original log data from which the metric was generated. By having the log data stored in a storage 350 retrievable through the log data service 330, the customer is able to subscribe to the service and always have access to its log data without having to generate customized code. Additionally, the customer can easily view metrics and analyze the metrics through retrieval of the source-level log data.

Figure 5:
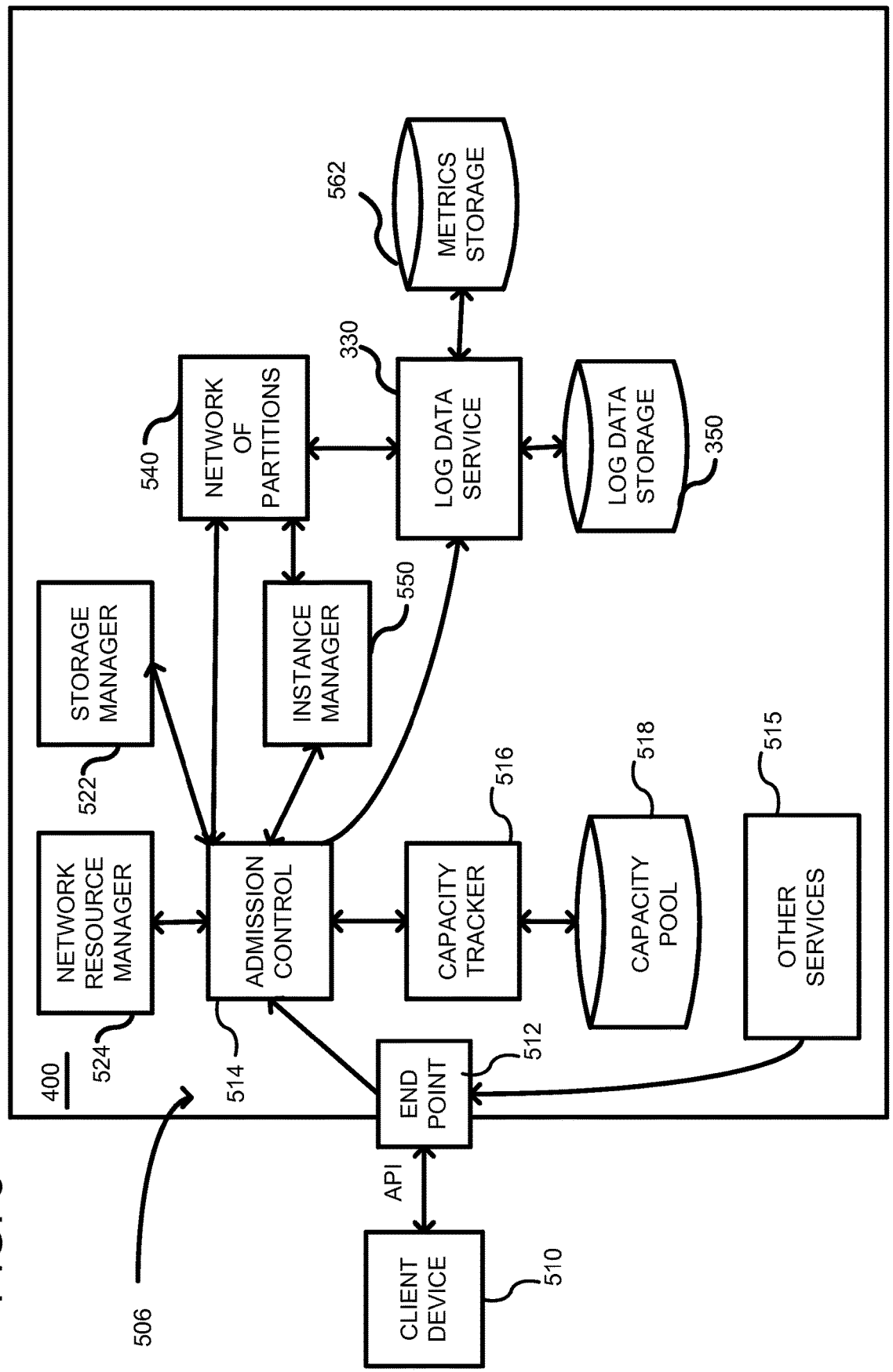
FIG. 5 shows further details of an example system including a plurality of management components associated with a control plane with the log data service for storing log data and metrics associated with the log data.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 500, can likewise make API requests to the end point 512.

Other general management services that may or may not be included in the compute service provider 500 include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. An instance manager 550 controls launching and termination of instances in the network. When an instruction is received (such as through an API request) to launch an instance, the instance manager pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 5 and includes a physical layer upon which the instances are launched.

The log data service 330 can provide monitoring for resources and the applications customers run on the compute service provider 400. System administrators can use the log data service 330 to collect and track metrics, and gain insight to how applications are running. For example, the log data service 330 can allow system-wide visibility into application performance and operational health. The log data service 330 can store metric data in a separate storage 562 and such metric data can contain metrics that are associated with instances 406. For example, the instances supply log data that is received by the log data service, which transforms the log data into metrics, which are stored in the metrics storage 562. The log data service further stores the log data in the log data storage 350. If desired, the metrics storage 562 and log data storage 350 can be merged into a single storage. The client device 510 can make API requests to view the metrics or source-level log data associated with the metrics. Still further, the client device 510 can make requests to view the raw log data. As indicated, the API requests from the client 510 can pass through the admission control 514 and onto the log data service 330.

Figure 6:
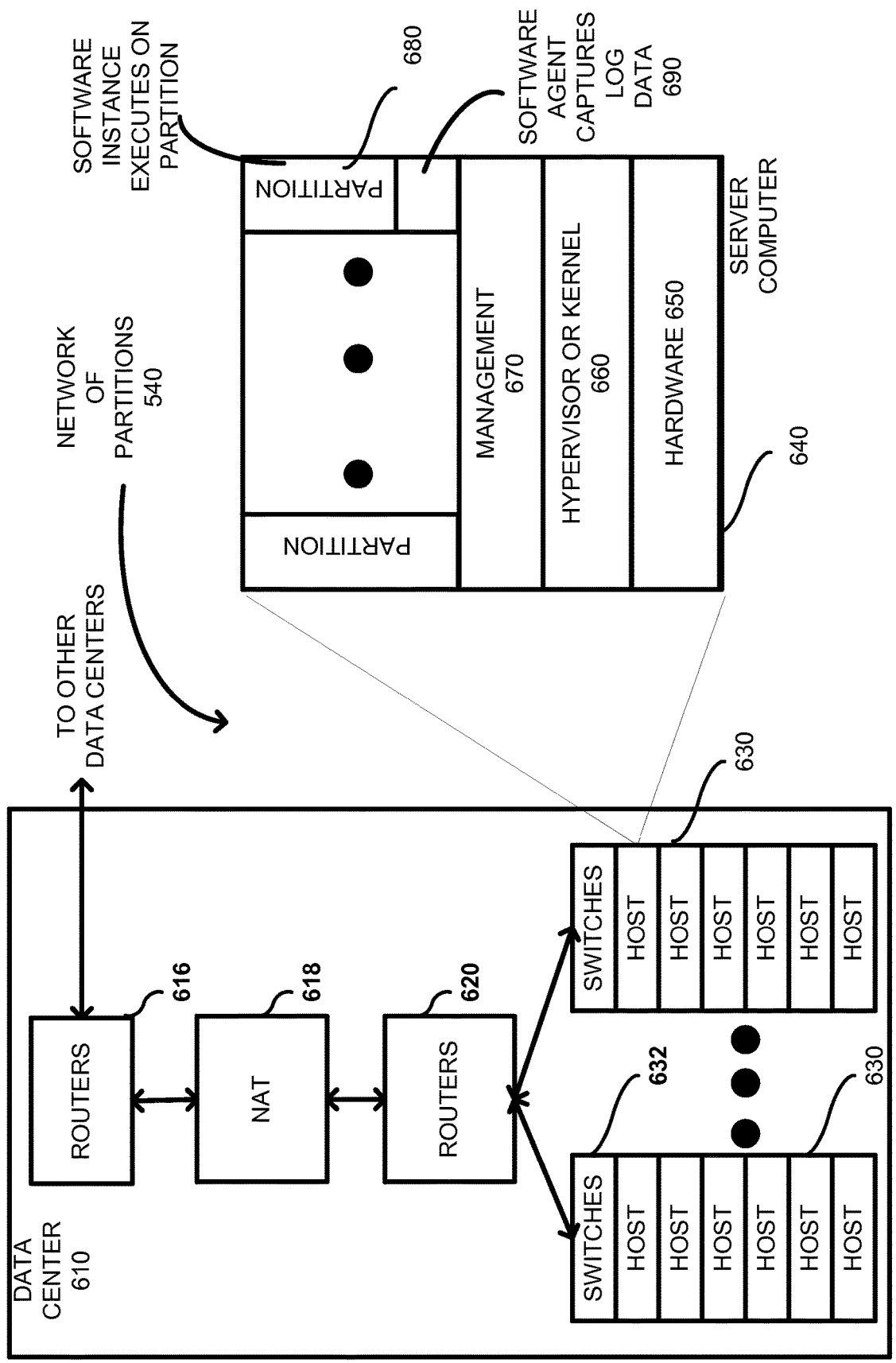
FIG. 6 shows an example of a plurality of host computers, routers and switches, which are hardware assets used for running virtual machine instances and a software agent used to generate the log data.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can execute its own virtual machine including a guest operating system. As such, each partition is an abstract portion of capacity designed to support its own virtual machine independent of the other partitions.

The virtual machine executing on a partition can include one or more applications and an operating system. Either the applications themselves or the operating system can include an agent 690, used to capture the log data. The log data can be passed by the agent through the management layer 670 to the log data service 330 (FIG. 5). The agent 690 can also generate the necessary parameters for transmission to the log data service, such as the stream name, the source identifier, the group name, etc. The source-level log data is a subpart of the log data that is used to generate metrics. Some parameters of the virtual machines executing on the partitions can be monitored using the management layer 670, which can then pass the metrics to the log data service 330 for storage in the log data storage 350. Further operations can be performed on the log data to extract particular metrics, which can be stored in the metrics storage 562. Additionally, the management layer 670 can pass to the log data service 330, the number of instances that are running, when they were launched, the operating system being used, the applications being run, etc. All such metrics can be used for consumption by the log data service 330.

Figure 7:
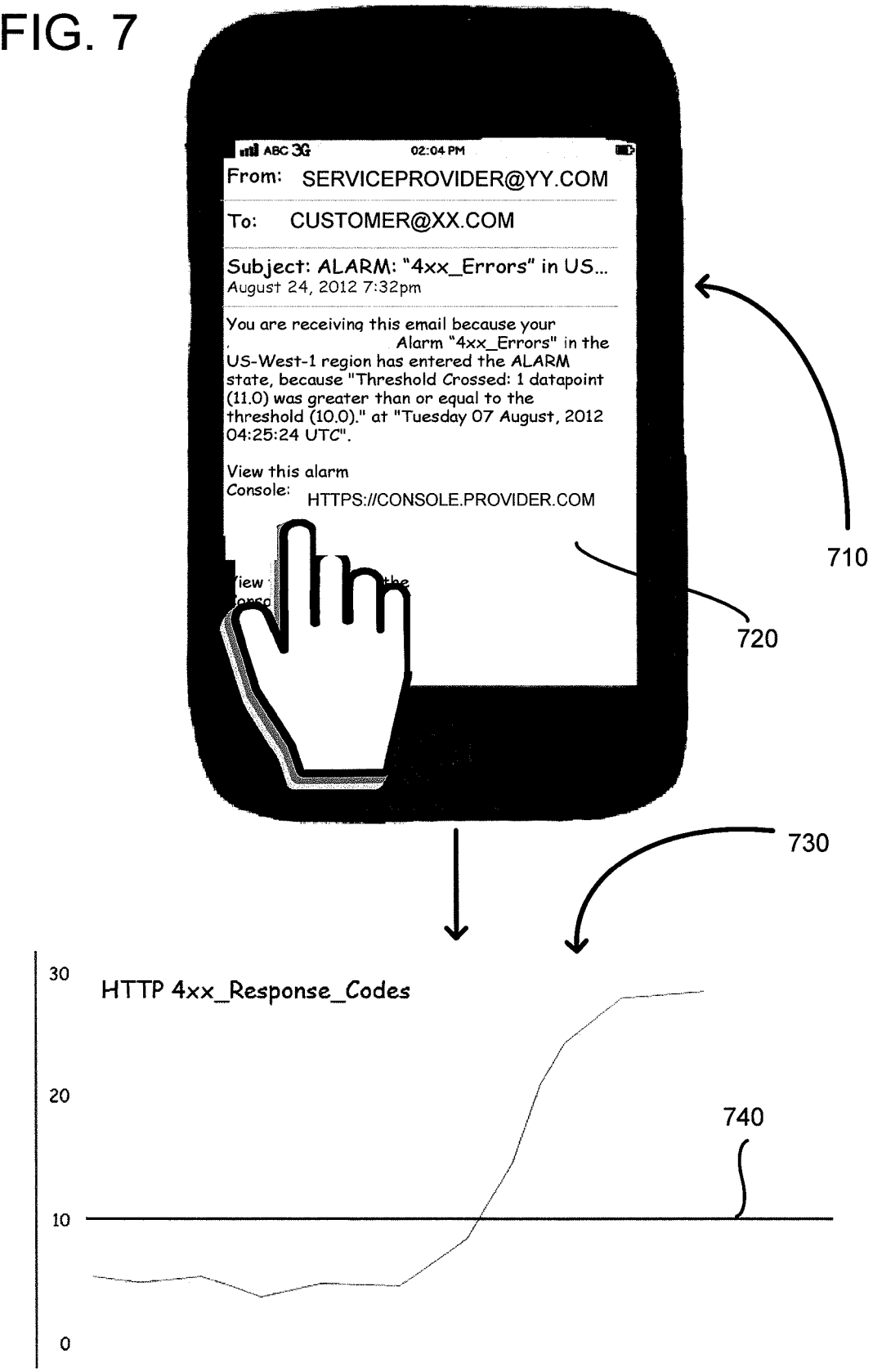
FIG. 7 shows a mobile device receiving an alert and a request by a user of the mobile device to view metric data, which illustrated as an interactive graph.

FIG. 7 is an example client device 710 shown as a mobile device. The client device has a GUI 720 upon which alerts can be posted automatically if metric data exceeds predetermined limits. For example, the log data service 330 can push such notifications to the client device 710 and the notifications can include links. In the illustrated example, a user selects a link in the GUI and metric data 730 is displayed as a graph in response thereto. A threshold 740 is displayed to show the user that the metric data has exceeded the threshold, which caused the alarm condition. As previously explained, when the user clicks on the link, a request is sent to the log data service 330 to view the metric data. The log data service 330 can then generate the metric data by searching through the log data storage 350 using a pattern. A metric filter including the pattern, together with the metric data 730 is passed back to the client device 710. The client device 710 can then store the metric filter together with other metadata received from the log data service. Examples of other metadata can include identifiers, such as group names and/or stream names, associated with the log data.

Figure 8:
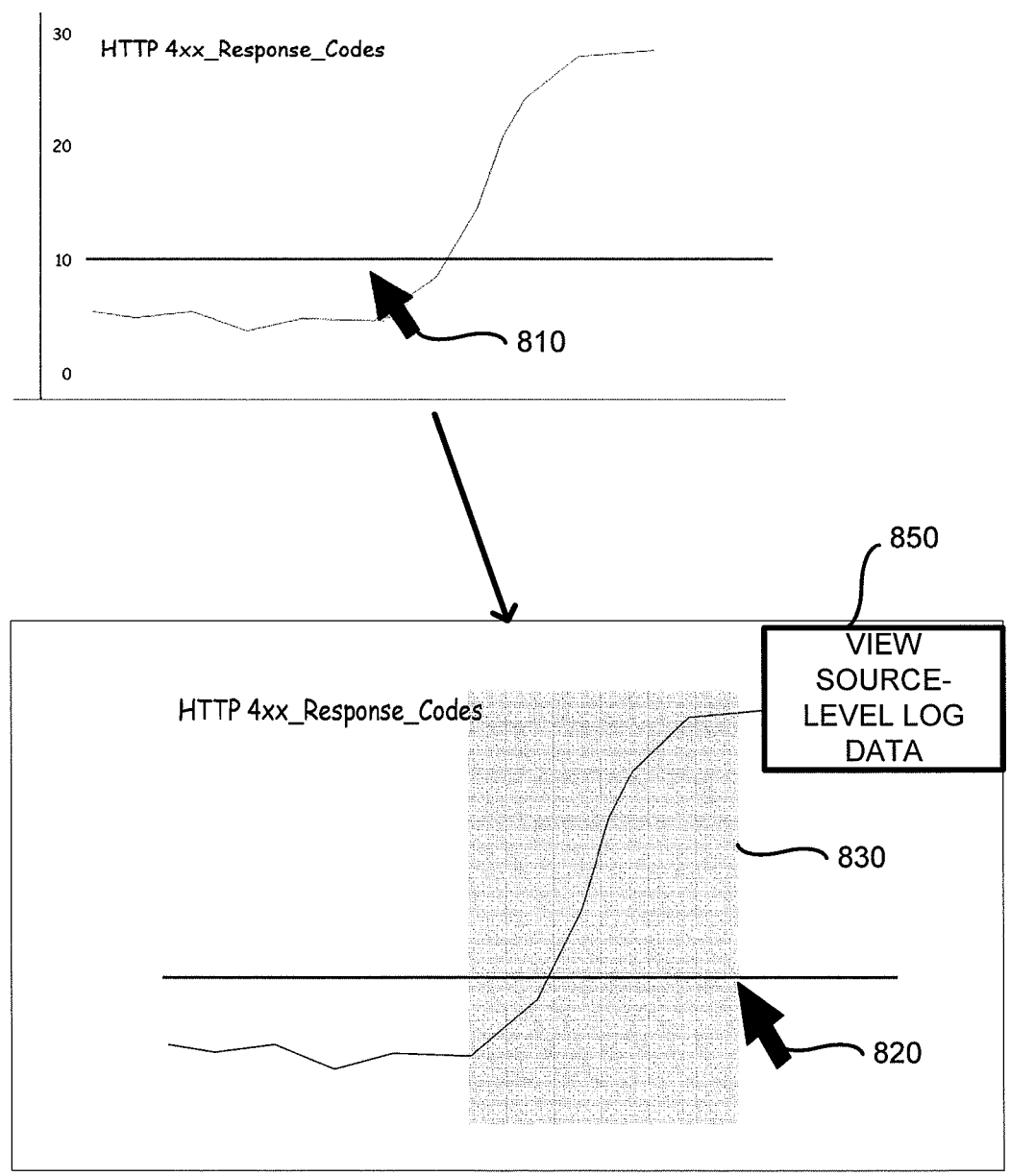
FIG. 8 shows a user selecting a start and end time using the interactive graph.

FIG. 8 shows additional GUI features wherein a user can request source-level log data for particular metrics by selecting a start time as shown at 810 by a user clicking at a first period of time on the interactive graph. At 820, a user selects an end time by clicking at a second period of time. A selected time range 830 can be automatically highlighted that overlaps the metric data to illustrate to the user the metric data to be further analyzed. The user can then select a button 850 in order to view the source-level log data associated with the selected time period. The source-level log data is those particular events in the overall log data that were used to generate the metric data associated with the displayed graph. Thus, the user can retrieve additional information about what events caused the metric data to occur. When the user selects the UI button 850, a script (not shown in FIG. 8, but shown in FIG. 1) is executed that generates an API request automatically. The API request is transmitted to the log data service in order to retrieve the source-level log data.

Figure 9:
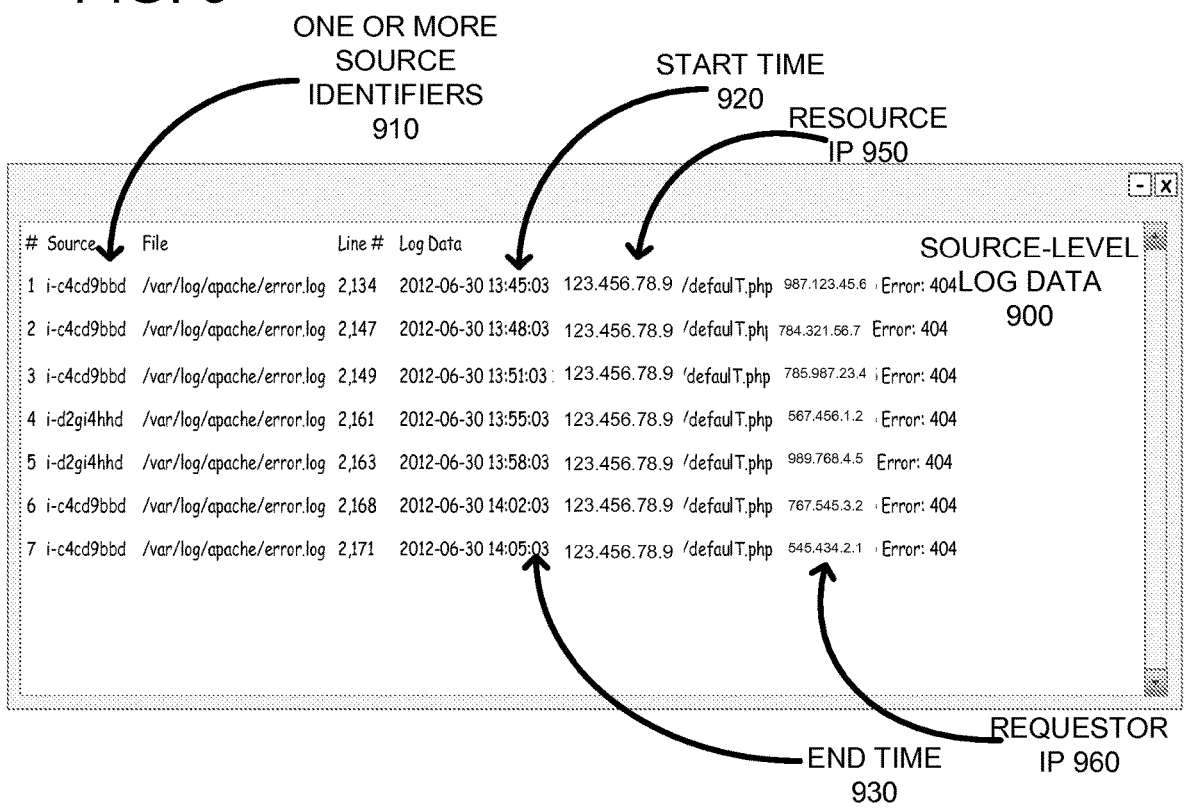
FIG. 9 shows a detailed example of the log data.

FIG. 9 illustrates a detailed example of source-level log data 900 that can be displayed on the client GUI in response to the user selecting the UI button 850 (FIG. 8). In this example, the source-level log data 900 can include one or more identifiers 910 associated with the log data. The identifiers can be associated with log groups or log streams, which were previously described. Example identifiers can be a GUID, or a simple name using alpha-numeric characters. Each row in the source-level log data 900 represents an event, and each event has an associated time stamp. As a result, a start time 920 is a time that a first event in the selected range occurred. An end time 930 is associated with a last event within the selected range. Other formats for displaying the source-level log data 900 can be used. Additionally, each row can include a resource IP address 950 indicating the resource relating to the log event, and a requestor IP address indicating a client device that made the request. Notably, the requestor IP addresses can be from different client devices.

Figure 10:
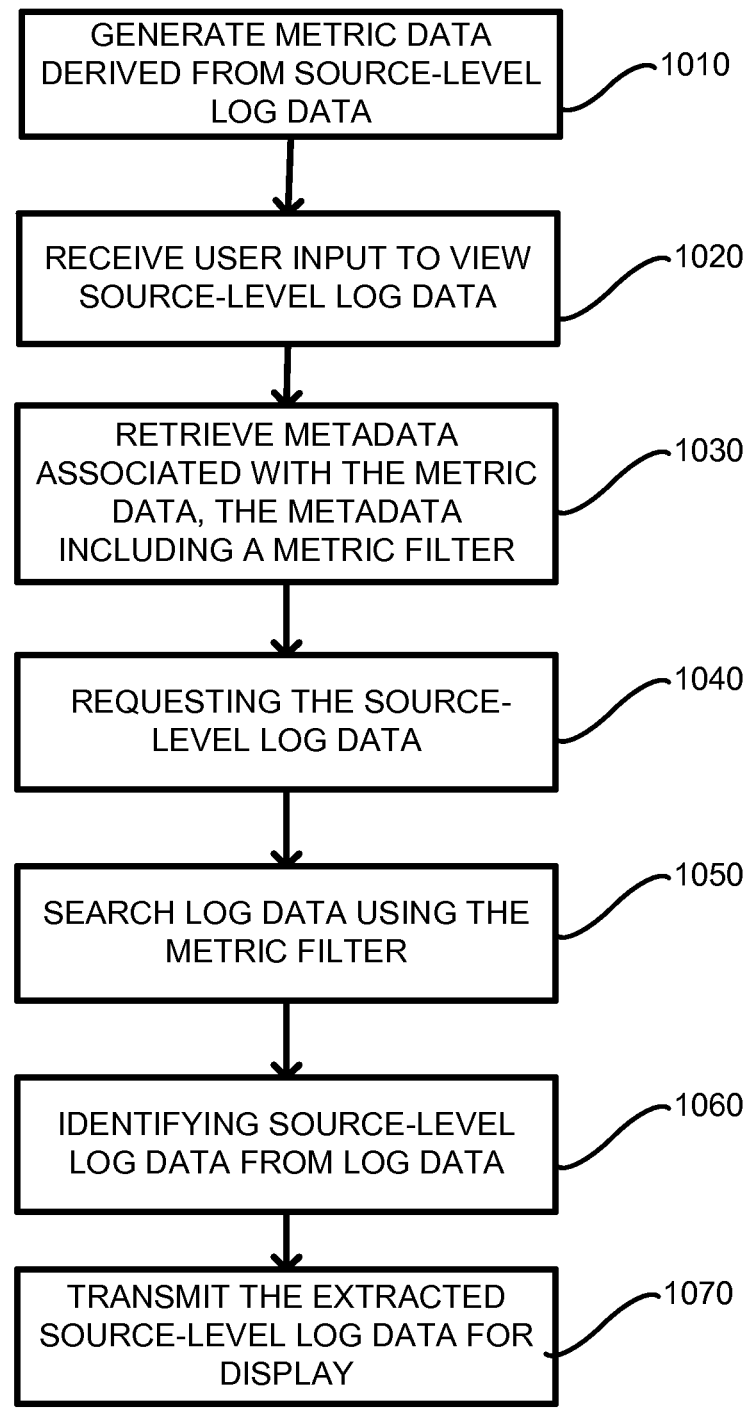
FIG. 10 is a flowchart of a method according to one embodiment for retrieving log data.

FIG. 10 is an example flowchart of a method for retrieving source-level log data. In process block 1010, metric data is generated by deriving it from source-level log data. For example, the metric data can be an error code and the source-level log data is each event that contains the error code. The metric data can be a simple count, for example. The metric data can then be displayed on a user interface. For example, the metric data can be displayed on a client device either by downloading the metric data to an application on the client device, or by accessing the metric data through a browser on the client device, wherein the browser is viewing the metric data on a host server computer. In some embodiments, the metric data is displayed as an interactive graph, wherein the user can select start and end times. In process block 1020, user input is received to view the source-level log data. The user input can be received in a variety of forms, such as through mouse clicks of UI elements, voice activated commands, etc. The user, therefore, requests to view each log event that contributed to the metric data. In process block 1030, metadata is retrieved associated with the metric data. The metadata can include a metric filter and other information used to identify the log data generally that is to be searched. For example, the metric filter can include a pattern that was used to generate the metric data in process block 1010. The information used to identify the log data can be a group or stream name or a unique identifier assigned to a group or stream. Additionally, multiple identifiers can be included, such as multiple group or stream names. Moreover, each identifier associated with the log data can have its own corresponding metric filter. In this way, multiple metric filters can be retrieved. The metadata can be stored locally on the client device or it can be retrieved from a remote server, such as a server running the log data service.

In process block 1040, a request, such as an API request, can be generated to retrieve the source-level log data. The API request can include a number of parameters including an identifier of the log group to search, the metric filter to use, and start and end times to define a scope of the search. Other parameters can be included or some of the above-identified parameters can be removed. The parameters can be a mix of input received from the GUI (e.g., start and end times) and information previously stored (e.g., the metric filter). In any event, the API request can be automatically generated in response to receiving the user input in process block 1020. The request can be transmitted from the client device to a server computer within the computer service provider.

In process block 1050, the server computer that receives the request can use the received parameters to perform a search. For example, the metric filter can be used to search the log data by using a pattern associated with the metric filter to search within the identified log data. In process block 1060, source-level log data is identified from the log data. Any events that include patterns that match the pattern of the metric filter are included as the source-level log data in the API response. Other events that do not have matching patterns are not included. In this way, the source-level log data is always a subset of the log data.

In process block 1070, the extracted source-level log data is transmitted for display on the client device. For example, the server computer in the compute service provider can transmit the source-level log data as part of an API response.

Figure 11:
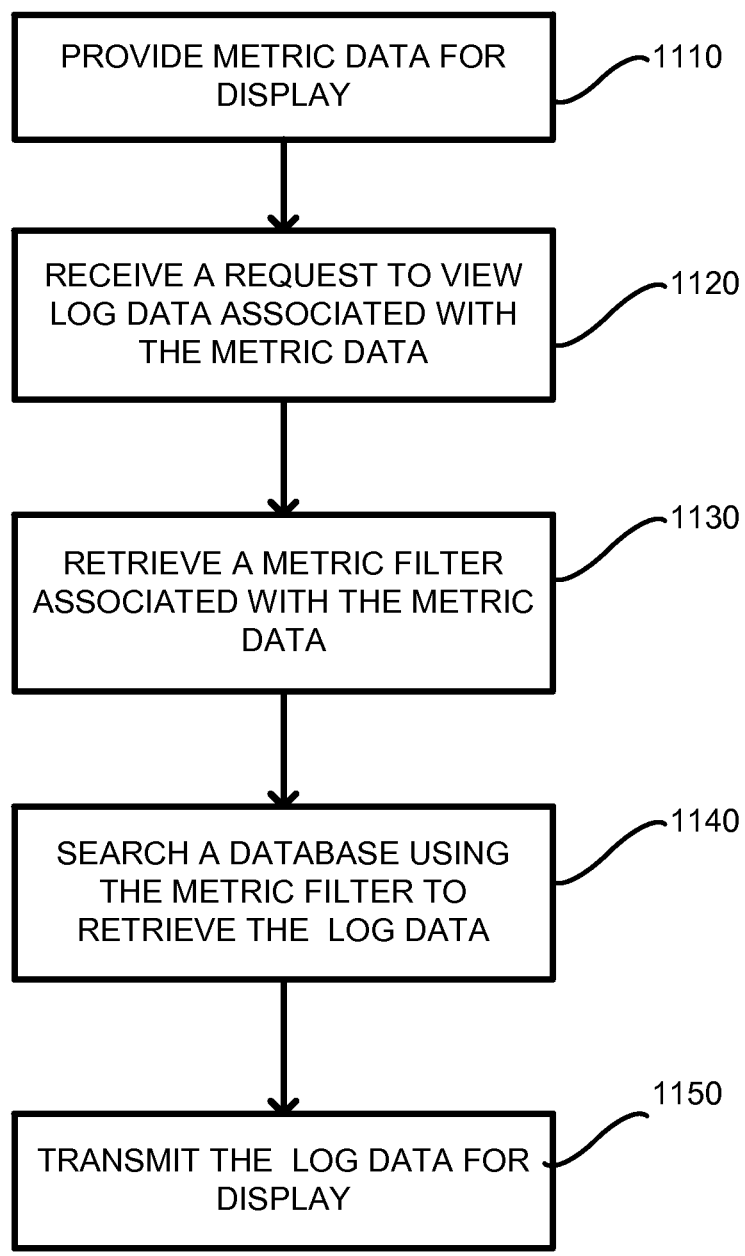
FIG. 11 is a flowchart of a method according to another embodiment for retrieving log data.

FIG. 11 is a flowchart according to another embodiment for retrieving log data. In process block 1110, metric data is provided for display. Providing the metric data for display can include transmitting the metric data from a server computer to the client device. Alternatively or in addition, providing the metric data for display can include transmitting the metric data to the UI rendering engine on a client device or server computer. Still further, providing metric data for display can include having a browser interface on the client device or an application with a browser-like interface, and streaming the rendering of the metric data to the client device for display. In process block 1120, a request is received to view log data associated with the metric data. For example, a user can make a selection on an interactive graph in a GUI, using any variety of common input mechanisms including a keyboard, mouse, touchscreen, etc. The request can include additional information to further limit an amount of data viewed. For example, time parameters, such as start and end times can be included in the request. In process block 1130, a metric filter is retrieved that is associated with the displayed metric data. As previously described, a pattern used to generate the metric data can be included as the metric filter. The metric filter can be locally stored and accessible by the UI script (e.g., see FIG. 1) or it can be retrieved remotely, such as from a server computer. In process block 1140, a storage is searched using the metric filter to retrieve the log data. Thus, a pattern can be used to search events in the storage. If the pattern is matched, then the event is included in a response that includes the log data. Time-based restrictions or other restrictions can be used to reduce the possible log events being searched. In process block 1150, the log data is transmitted for display. The transmitting for display can be in the form of a response to the request. Transmitting can also include or alternatively include transmitting from a UI script to a rendering engine for display.

Figure 12:
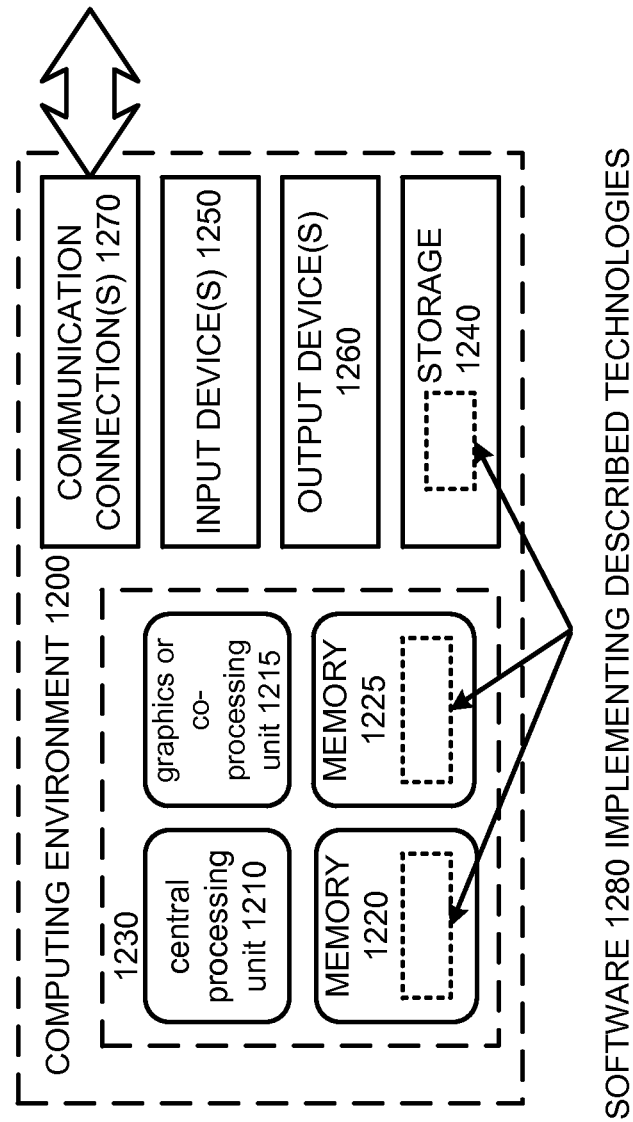
FIG. 12 depicts a generalized example of a suitable computing environment in which the described innovations may be implemented.

FIG. 12 depicts a generalized example of a suitable computing environment 1200 in which the described innovations may be implemented. The computing environment 1200 is not intended to suggest any limitation as to scope of use or functionality, as the innovations may be implemented in diverse computing systems. For example, the computing environment 1200 can be any of a variety of computing devices (e.g., desktop computer, laptop computer, server computer, tablet computer, etc.)

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing environment 1200. The output device (s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of retrieving source-level log data associated with metric data, comprising:
    generating metric data from associated source-level log data, using a metric filter, to display as a graph on a client device, wherein the metric filter comprises a pattern of an error message;
    receiving a user input to view the source-level log data associated with the graph of the metric data, wherein the user input includes at least start and end times associated with the source-level log data so that the user selects a period of time associated with the source-level log data;
    retrieving metadata, wherein the metadata comprises the metric filter associated with the graph of the metric data and one or more identifiers of the source-level log data, wherein the metadata is located on a server computer in a compute service provider environment;

receiving a request from a user interface (UI) script to extract the source-level log data satisfying the metric filter over the selected time period;

searching log data using the metric filter and the start and end times;

retrieving the source-level log data based at least in part on the searching; and transmitting the retrieved source-level log data to the client device for display to the user.

2. The method of claim 1, wherein the extracting the source-level log data includes using the pattern from the metric filter to search in the log data in order to determine events matching the metric filter.

3. The method of claim 1, wherein the source-level log data is associated with multiple log streams and retrieving the metadata includes retrieving multiple metric filters.

4. One or more non-transitory computer-readable media storing instructions which, when executed by one or more processors, cause the processors to perform operations comprising:

generating metric data from associated source-level log data, using a metric filter, to display as a graph on a client device, wherein the metric filter comprises a pattern of an error message;

receiving a user input to view the source-level log data associated with the graph of the metric data, wherein the user input includes at least start and end times associated with the source-level log data so that the user selects a period of time associated with the source-level log data;

retrieving metadata, wherein the metadata comprises the metric filter associated with the graph of the metric data and one or more identifiers of the source-level log data, wherein the metadata is located on a server computer in a compute service provider environment;

receiving a request from a user interface (UI) script to extract the source-level log data satisfying the metric filter over the selected time period;

searching stored log data using the metric filter and the start and end times;

retrieving the source-level log data based at least in part on the search; and transmitting the retrieved source-level log data to the client device for display to the user.

5. The one or more non-transitory computer-readable media of claim 4, wherein the operations further comprise transmitting the metric data from the server computer to the client device.

6. The one or more non-transitory computer-readable media of claim 4, wherein the start and end times included in the user input are graphically selected on the graph of the metric data.

7. The one or more non-transitory computer-readable media of claim 4, wherein the searching the stored log data includes obtaining the pattern and comparing the pattern to different patterns in log entries in the stored log data.

8. The one or more non-transitory computer-readable media of claim 4, wherein the received request includes an Application Program Interface (API) request.

9. The one or more non-transitory computer-readable media of claim 8, wherein the API request includes a name associated with one or more log streams stored in the stored log data.

10. The one or more non-transitory computer-readable media of claim 8, wherein the operations further comprise:

providing the UI script; and upon selection of a user interface button, executing the UI script to generate the API request to extract the source-level log data.

11. The one or more non-transitory computer-readable media of claim 4, wherein the operations further comprise:

retrieving a log group identifier associated with the metric data; and using the log group identifier for the searching the stored log data.

12. The one or more non-transitory computer-readable media of claim 4, wherein the transmitting the retrieved source-level log data for display includes transmitting a response to the received request.

13. The one or more non-transitory computer-readable media of claim 4, wherein the operations further comprise pushing a notification to the client device if the metric data exceeds a predetermined limit.

14. A system comprising:

one or more processors with memory coupled thereto, wherein the one or more processors are configured to:

generate metric data from associated source-level log data, using a metric filter, to display as a graph of the metric data on a client device, wherein the metric filter comprises a pattern of an error message;

receive a user input to view the source-level log data associated with the graph of the metric data, wherein the user input includes at least start and end times associated with the source-level log data so that the user selects a period of time associated with the source-level log data;

retrieve metadata, wherein the metadata comprises the metric filter associated with the graph of the metric data and one or more identifiers of the source-level log data, wherein the metadata is located on a server computer in a compute service provider environment;

receive a request from a user interface (UI) script to extract the source-level log data satisfying the metric filter over the selected time period;

search stored log data using the metric filter and the start and end times;

retrieve the source-level log data based at least in part on the search; and transmit the retrieved source-level log data to the client device for display to the user.

15. The system of claim 14, further comprising:

a first storage for storing the stored log data; and second storage, accessible by the UI script, for storing the metadata associated with comprising the metric data.

16. The system of claim 14, further including a user interface rendering engine associated with the UI script for displaying the graph of the metric data on the client device.

17. The system of claim 14, further including a virtual machine executing on another server computer, the virtual machine including an agent for monitoring an application and generating the source-level log data.

18. The system of claim 14, wherein the stored log data comprises a plurality of log streams generated by virtual machines in a multi-tenant environment.

* * * * *